United States Patent [19]

Price et al.

[11] Patent Number: 5,496,404
[45] Date of Patent: Mar. 5, 1996

[54] PROCESS OF RECYCLING PAINT WASTE

[75] Inventors: James W. Price, Ventura; David M. Long, Fullerton, both of Calif.

[73] Assignee: Waste Markets, Inc., Ventura, Calif.

[21] Appl. No.: 523,192

[22] Filed: Sep. 5, 1995

Related U.S. Application Data

[63] Continuation-in-part of Ser. No. 217,276, Mar. 24, 1994, abandoned, which is a continuation-in-part of Ser. No. 57,177, May 3, 1993, abandoned, which is a continuation-in-part of Ser. No. 403,077, Mar. 13, 1995, abandoned.

[51] Int. Cl.$^6$ .................................................. C04B 7/36
[52] U.S. Cl. .................... 106/407; 106/724; 106/739; 106/745; 588/257
[58] Field of Search .................... 106/407, 739, 106/745, 724, 823; 588/257

[56] References Cited

U.S. PATENT DOCUMENTS

| | | | |
|---|---|---|---|
| 523,645 | 7/1894 | Rigby . | |
| 3,947,283 | 3/1976 | Uchikawa et al. | 106/89 |
| 4,081,285 | 3/1978 | Pennell | 106/100 |
| 4,116,705 | 9/1978 | Chappell | 106/90 |
| 4,219,363 | 8/1980 | Tokar et al. | 106/745 |
| 4,224,077 | 9/1980 | Olifer et al. | 106/745 |
| 4,280,921 | 7/1981 | May | 252/301.1 |
| 4,383,928 | 5/1983 | Sherwood | 210/724 |
| 4,434,048 | 6/1984 | Brunbeck et al. | 210/726 |
| 5,004,550 | 4/1991 | Beckman et al. | 210/710 |
| 5,167,711 | 12/1992 | Wichner et al. | 106/705 |
| 5,286,427 | 2/1994 | Koumal | 264/40.1 |

FOREIGN PATENT DOCUMENTS

| | | |
|---|---|---|
| 2707985 | 8/1978 | Germany . |
| 2839829 | 3/1979 | Germany . |
| 53-127511 | 11/1978 | Japan . |
| 54-019472 | 2/1979 | Japan . |
| 7027954 | 2/1982 | Japan . |
| 922098 | 4/1982 | U.S.S.R. . |
| 10415299 | 9/1983 | U.S.S.R. . |
| 1065381 | 1/1984 | U.S.S.R. . |
| 1076416 | 2/1984 | U.S.S.R. . |
| 11642246 | 6/1985 | U.S.S.R. . |

*Primary Examiner*—Paul Marcantoni
*Attorney, Agent, or Firm*—Jack C. Munro

[57] ABSTRACT

A process for utilizing waste by combining of the waste with a mineral based solid material forming an additive. This additive is included as an ingredient in the manufacture of Portland cement with the additive being added to the cement clinker after heat treating of the raw material constituents producing the cement clinker.

3 Claims, No Drawings

PROCESS OF RECYCLING PAINT WASTE

REFERENCE TO PRIOR APPLICATIONS

This application is a continuation-in-part of patent application Ser. No. 08/217,276, now abandoned, entitled PROCESS OF RECYCLING LATEX PAINT WASTE AND PRODUCT THEREFOR, filed Mar. 24, 1994, now abandoned, by the same inventors. Patent application Ser. No. 08/217,276 was a continuation-in-part of previously filed patent application Ser. No. 08/057,177, entitled PROCESS OF RECYCLING LATEX PAINT WASTE, filed May 3, 1993, also by the same inventors. Patent application Ser. No. 08/057,177, now abandoned, was a continuation-in-part of previously filed patent application Ser. No. 08/403,077, now abandoned, entitled PROCESS OF RECYCLING PAINT WASTE, filed Mar. 13, 1995.

BACKGROUND OF THE INVENTION

1) Field of the Invention

The field of this invention relates to recycling of certain waste and more particularly to recycling of latex paints and other similar materials to be utilized as an ingredient in Portland cement which is then to be used to produce concrete building materials.

2) Description of the Prior Art

The process of this invention is to be discussed specifically in conjunction with a latex paint. However, it is considered to be within the scope of this invention that the process could be utilized with other products such as water-based paint, water-soluble pigments, resists and water-soluble adhesives.

Latex paint is in exceedingly common usage not only by the general public but also by businesses. In recent years there has been a direction of movement from solvent based paint to the latex type of paint. The main objection to a solvent based paint is to its emission within the air of a petroleum based substance which when breathed is believed to be damaging to humans and is also potentially explosive. The result has been a substantial increase in the volume of usage of latex paints which similarly increased the waste of latex paint.

Whenever a decision is made to paint a given structure, invariably there will be provided an amount in excess of that which is actually needed. This excess becomes waste. This waste usually ends up being thrown away. The disposing of latex paint within landfills is being objected to which has resulted in increasingly restrictive state, local and federal regulations. These regulations are requiring that latex paint waste is to be handled as a hazardous waste. Disposal of a hazardous waste is an extremely expensive procedure.

Concrete building materials are manufactured in a substantial amount throughout the world. The manufacturing of a cement building material consists of a combination of an inert substance such as sand, a binder and water. The binder is typically called Portland cement. The cement reacts chemically with water to set and harden through chemical reactions.

Portland cement is a type of hydraulic cement in the form of a finely divided, gray powder composed of lime, alumina, silica and iron oxide. Small amounts of magnesium, sodium, potassium and sulfur are also present. The cement may be modified to include a plasticizer to improve adhesion, strength, flexibility and curing properties.

Cement can be manufactured by either a wet process or in a dry process. Where the raw materials have a high moisture content (such as chalk and clay), the wet process is used. The dry process is used for harder raw materials such as limestone and shale. In both processes the resulting mixture is burned generally within a kiln. The burning process can be either by calcining, roasting or autoclaving with calcining being commonly used. The operating temperature of the heat is generally about 2600 degrees Fahrenheit. During the heating process the mixture is partially fused forming lumps referred to as cement clinker. The cement clinker is then ground to the fine dry powder which is known as Portland cement. During grinding of the cement clinker, the cement may be modified to include a plasticizer or to include other specialty type of ingredients.

There are a number of mineral-based solid materials that are chemically compatible for use as an ingredient in the manufacture of Portland cement and other concrete products. These mineral-based solid materials are not typically utilized due to not being readily available to the manufacturer of the cement. Examples of such materials that are not utilized but would work satisfactorily are listed under the Detailed Description of the Preferred Embodiment.

The present invention differs from the prior art in that the product of this invention is added during the final grinding with the clinker and is not processed through the calcination portion of the manufacturing process, is not claimed to be used in the formulation or manufacture of cement clinker, and is not claimed to have fuel value. The prior art references of Pennell U.S. Pat. No. 4,081,285; Rigby et. al. U.S. Pat. No. 523,645; Babcock-Hitachi JP 357027954; Zaporozhe Titanium and Magnesium Complex, Krivoi Rog Cement Works DE A 2839829 and Cement Ind. Res. Inst. collectively address use as feed into the kiln for combining with other raw materials in clinker formation or fuel for the calcining process. The important distinction between the present invention and these citations is in the chemical transformations that occur when the raw feed materials are introduced to temperatures of calcination (about 2600° F. for a period of up to three hours).

The present invention differs from other citations such as Chapple U.S. Pat. No. 4,116,705, Sherwood et. al. U.S. Pat. No. 4,383,928, Wichner et. al. U.S. Pat. No. 5,167,711, Brunbeck et. al. U.S. Pat. No. 4,454,048, Koumal U.S. Pat. No. 5,286,427, and Hitachi Shipbld Engg KK JP A 0019472 in that the latex paint is claimed to be used in the manufacture of Portland cement rather than used in concrete or concrete products which uses Portland cement to form a monolithic structure. The cementaceous reactions that occur when Portland cement is hydrated involves chemical reactions that form a solid monolithic matrix and is the basis for all concrete technology. The present invention is that the latex paint is in a product that when ground with the clinker and gypsum enhances the performance of the resultant concrete and it is not claimed as a treatment process or a method for solidifying, immobilizing, or similar method of incorporation of the waste into a concrete matrix. None of the prior art discusses enhancement of strength or plasticity in the Portland cement when used for treatment processing or formation of the solidified mass that is used as a building material (see Sherwood U.S. Pat. No. 4,383,928). Strength enhancement and plasticity are part of the attributes of the product additive of the present invention.

The present invention is more similar to that of Kuhlmann EP 537411, Zhangabylov et. al. "Coagulation of Divinyl-strene Latex in Suspensions of Portland Cement and Its Mineral Studies in Connection with Strengthening Oil Wells", Tr. Inst. Khim. 1971, Isenburg et. al. "Hypothesis for Reinforcement of Portland Cement by Polymer Latexes", J. Amer. Ceram. Soc. 1974, Vess U.S. Pat. No. 4,725,632, Eash 4,202,809, and Ceska U.S. Pat. No. 4,398,957, who claim that the use of latex additives enhance Portland cement performance. The additives consisting of finely divided latex (or chemically similar materials in a water media) solids are added to the Portland cement either at the work site or formulated with the Portland cement. The use of the latex paint additive of this invention acts in a similar fashion, replacing the virgin materials noted in these references. The novelty of the present invention is that the latex paint additive is derived from waste latex paints or chemically similar materials.

The foregoing mentioned references were cited and applied in the parent applications U.S. Ser. Nos. 08/217,276, 08/057,177 and 08/403,077.

SUMMARY OF THE INVENTION

The process of the present invention utilizes conventional manufacturing techniques for Portland cement, either the wet process or the dry process, with each process producing, after being heated, a cement clinker. The process of the present invention utilizes a quantity of waste, such as latex paint, and combines that quantity of waste with the manufactured cement clinker. Normally this combination occurs at the time the cement clinker is pulverized into the finely divided gray powder producing Portland cement. However, the combination could occur after the cement clinker has been pulverized. The amount of waste that is added to the cement clinker or the pulverized cement varies between 0.2 percent to three percent by weight. One-half percent is the normal amount utilized with Type 1 or Type 2 cements. Three percent is the amount that is utilized with mortar or plastic cements. The product is composed of an evenly mixed one to one (by weight) relationship of latex paint and a calcium based solid material. An conglomeration having a consistency of clods to sand is produced. It is this conglomeration that is utilized in the one-half to three percent range with the Portland cement. Instead a calcium based solid material, silica material (perlite, diatomaceous earth and clay), iron based material (clay or pyrite ashes) and aluminum materials (clay or aluminum dross) could be used. A purpose of the solid mineral component is to provide color uniformity to the product of this invention.

The primary objective of the present invention is a process which utilizes a substance which is deemed by regulations to be hazardous waste in a common manufacturing operation that produces commonly available building materials, thereby eliminating the need to dispose of material that is discarded in landfills.

Another objective of the present invention is that the titanium dioxide, other pigments and fillers in the latex and water-soluble paints and coatings contribute to the total calcium and mineral requirements that are necessary in the final manufacturing of Portland cement.

Another objective of the present invention is that the processed latex waste enhances the performance and strength of concretes produced with the Portland cement.

DETAILED DESCRIPTION OF THE PREFERRED EMBODIMENT

A quantity of waste is obtained. The waste could be essentially all liquid, essentially all solid or a combination liquid and solid. A typical waste used within the process of this invention would be within the group comprising latex paint waste, water based paints, water-soluble pigments, water based coatings, resists, water-soluble glue and adhesives. Resists are liquid products used in silk screen work, etching and chemical millings. One part of waste is to be combined by weight with one part of a mineral-based solid material, producing an additive. However, if the waste is primarily liquid, as much as three times by weight of the solid material may be used for one part by weight of the waste. The mineral-based solid material can comprise any one of the following or can comprise combinations thereof: Calcium carbonate from the manufacture of sugar from sugar beets, combustion ash from incineration processes, fly ash from emission control devices, spent filter media which comprises diatomaceous earth or perlite, calcium based material from water treatment, slag fines, aluminum dross fines, clay fines from classification systems, pyrite ashes, cinder fines from aggregate manufacture and shale fines from classification systems. Lime kiln dust, kiln dust from the firing of clay products and cement kiln dust could also be utilized. There are also usable a number of virgin materials such as ground limestone, diatomaceous earth, perlite, bauxite, clays, silica sand and dolomite. Latex paint and coatings contain significant concentrations of calcium carbonate, clay, pigments and other mineral products.

This mixing is to be accomplished thoroughly with a typical mixing apparatus such as a pug mill. A pug mill can be generally defined as a tank type container within which is mounted an auger. The auger is to be rotated which is to achieve the desired mixing of the solid material and the waste that has been deposited within the tank.

The thoroughly mixed additive is to then be removed from the mixer with such removal generally being by means of a conveyor. The consistency of the material at this time is that of a nonconsolidating wet earth. Wet earth means formed of damp granules which are pliable and can be readily manually formed into clods. It is not hard, like rock. It is conveyable but it is non-pumpable. This wet earth type of substance may then be air dried at ambient temperatures. However, drying is optional. After drying has occurred, the additive has achieved a consistency similar to dry earth with part of it being in clod-like form and other parts of it being in small granules resembling sand. This additive is combined with cement clinker which is then pulverized into the fine powder forming the Portland cement.

It is important to note that the additive is used only after the calcination forms the cement clinker. This calcining occurs only by heat treatment. However, the additive could be dried, pulverized and then evenly mixed with the fine powder Portland cement. The amount of the additive (by weight) to the Portland cement will generally be within the range of one-half percent to three percent. The additive functions as part of the materials that are required for the final manufacture of the Portland cement. Therefore, a lesser amount of these other ingredients is required when using the additive produced by the process of the present invention. A hydraulic Portland cement is composed of four main constituents which are tricalcium silicate, tricalcium aluminate, dicalcium silicate, and tetracalicum aluminoferrate. Normally included within Portland cement is also small amounts of magnesia, sodium, potassium and sulfur.

Within the prior art the ingredients of Portland cement have always been for the purpose of their mineral constituents and/or fuel value. The ingredients in the additive included within the process of the present invention are to be added to the Portland cement following the heat treatment of the Portland cement. The heat treatment, if applied to the additive included within the process of the present invention, would reduce the product value of the additive to that of the mineral components while negating the inherent value of the latex-like compounds to the finished Portland cement. Therefore, it is important to add the additive after the calcining process of the raw materials of the cement clinker. In both the wet process and dry process of cement manufacture, calcining is required to fuse the cement raw material mixture into lumps of cement clinker. The cement clinker is conducted into a kiln at the operating temperature of 2600 degrees Fahrenheit for up to three hours.

Materials in the kiln lose their identity as new chemical combinations are created, gases are exhausted, and any organic compounds burned. These combinations of occurrences are not to occur using the latex paint additive of this invention due to being added after heat treatment of the Portland cement and consequently is believed to be a novel claim of this invention. The cement clinker is then cooled to normal ambient temperature and then ground along with modifiers, such as gypsum and plasticizers, into fine powder that is known as Portland cement. It is recognized that there are known over fifty different types of Portland cement each with differing amounts and types of modifiers added. At each stage in the cement manufacture the composition is carefully monitored to ensure that the final product has the desired properties.

It is important to understand that utilizing the additive within the process of the present invention substitutes for the plasticizers that are commonly used to produce Portland cement. Also, utilizing the additive within the process of the present invention permits certain other basic ingredients to be decreased in amount. For example, since the additive includes calcium, a slightly lesser amount of a main calcium ingredient within the Portland cement only needs to be used.

The produced material from the process of the present invention can be readily transported to any manufacturing site by common vehicle such as trucks and railroad cars.

What is claimed is:

1. The process of recycling waste by utilizing the waste as an additive ingredient in the manufacture of Portland cement substituting for virgin ingredients normally used in the manufacture of the Portland cement eliminating the need for disposing of the waste in a landfill where the Portland cement is produced from a cement clinker which has been produced by burning, said process comprising the following steps:

obtaining a first quantity of a waste selected from the group consisting of latex paint, water base paint, water-soluble pigments, water-soluble adhesives and water-soluble resists with waste being in liquid form or in solid form, or in a combination of liquid and solid;

obtaining a second quantity of a solid material selected from the group consisting of calcium carbonate, combustion ash, diatomaceous earth, perlite, slag fines, aluminum dross fines, clay fines, pyrite ashes, cinder fines, shale fines, bauxite, silica sand and dolomite;

mixing thoroughly together said first quantity and said second quantity producing a non-compacted additive having the consistency of wet earth that is readily pliable with the second quantity by weight not exceeding three times the first quantity by weight;

adding the additive as an ingredient in the manufacture of Portland cement with this adding occurring after the burning of the raw materials producing cement clinker; and pulverizing of this cement clinker and at the same time evenly mixing of the additive.

2. The process as defined in claim 1 wherein between the mixing step and the adding step there is added the additional step of:

drying the additive into a combined mass of manually breakable clods and small granules.

3. The process as defined in claim 1 wherein:

the mixing step includes approximately equal quantities by weight of the waste and the solid material.

* * * * *